Oct. 25, 1927.  
C. E. GORDON  
1,646,817  
AUTOMATIC DISPENSING AND WEIGHING MACHINE  
Filed Sept. 24, 1925  
5 Sheets-Sheet 1
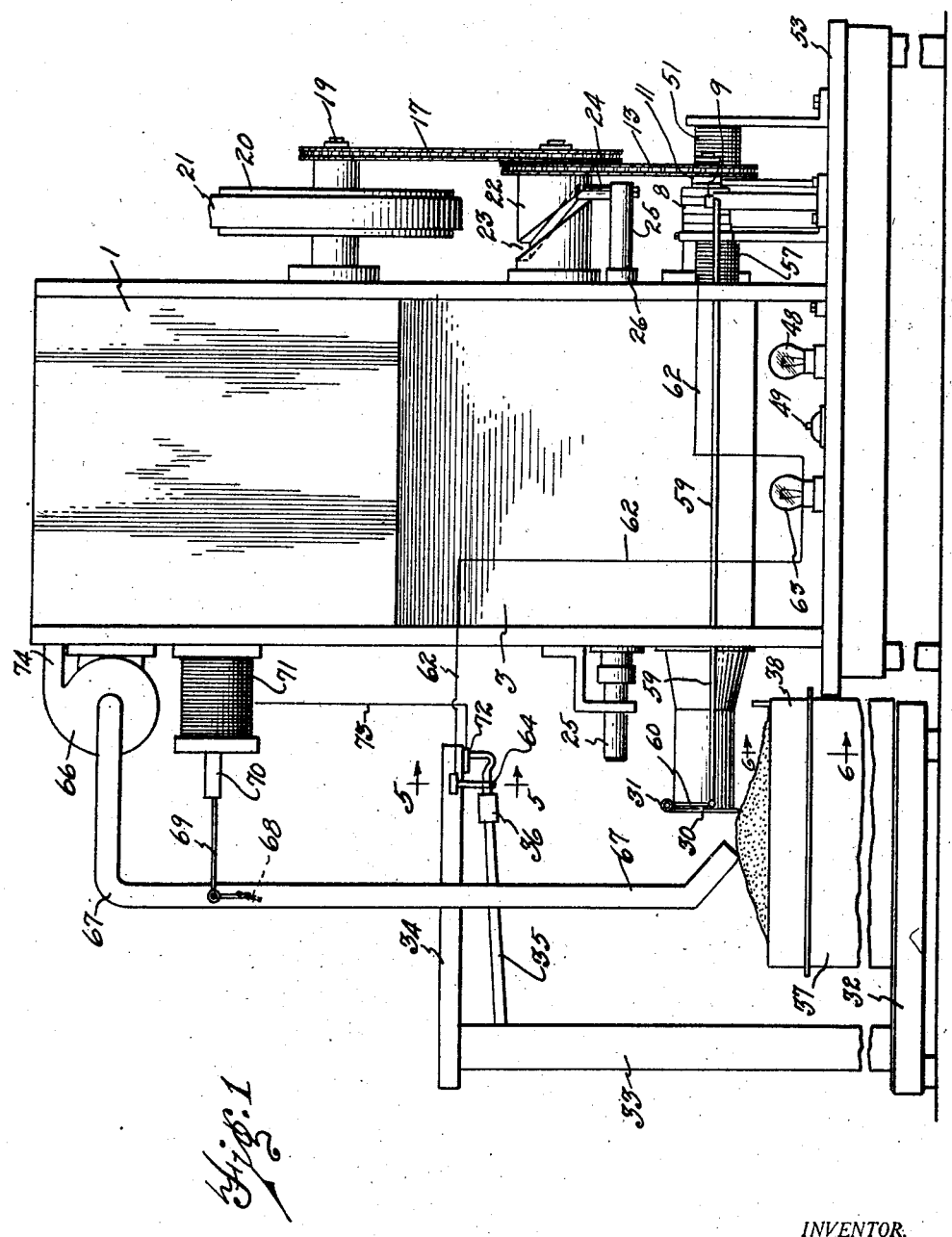
INVENTOR.  
CHARLES E. GORDON  
BY  
ATTORNEY.

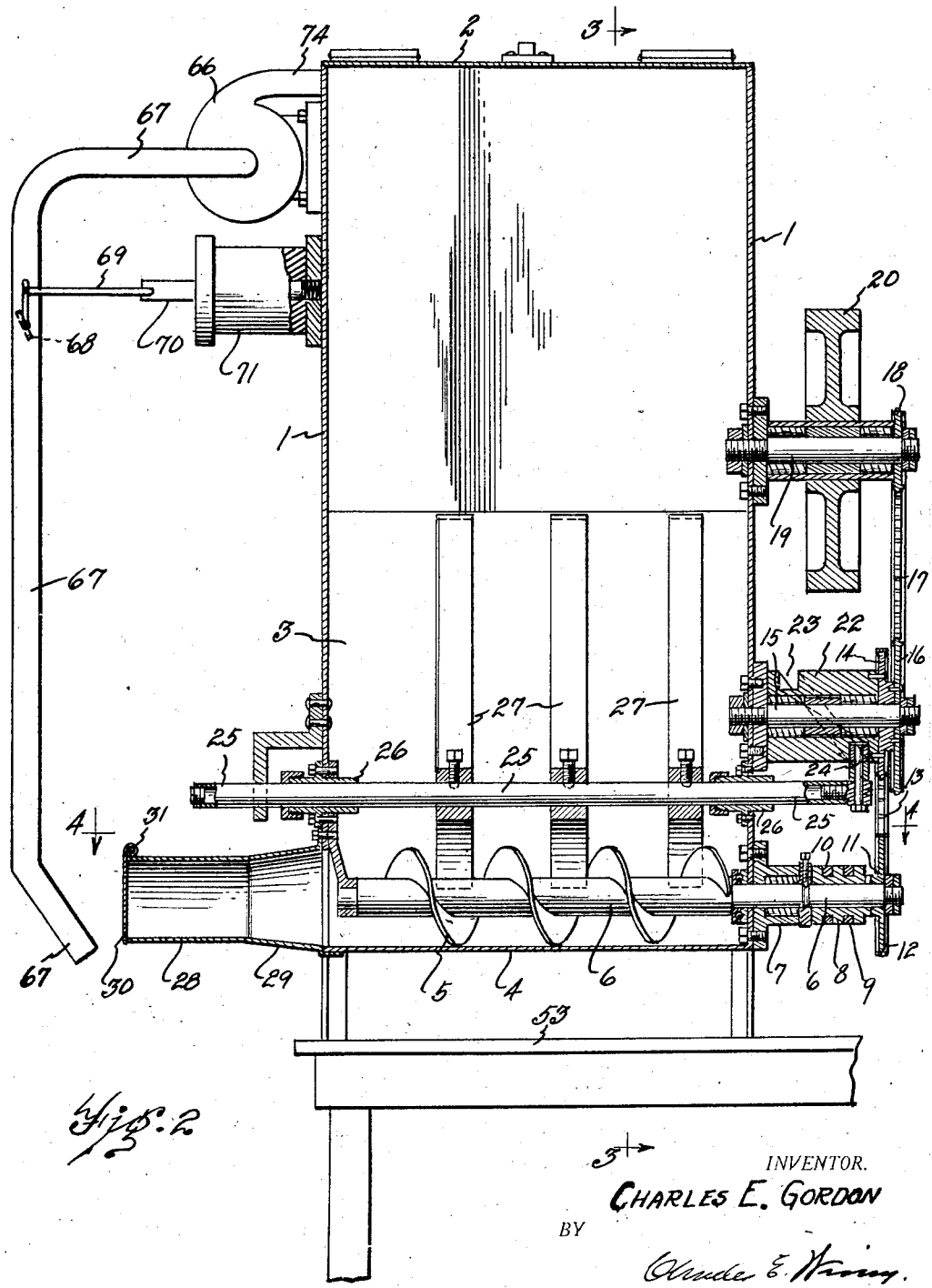

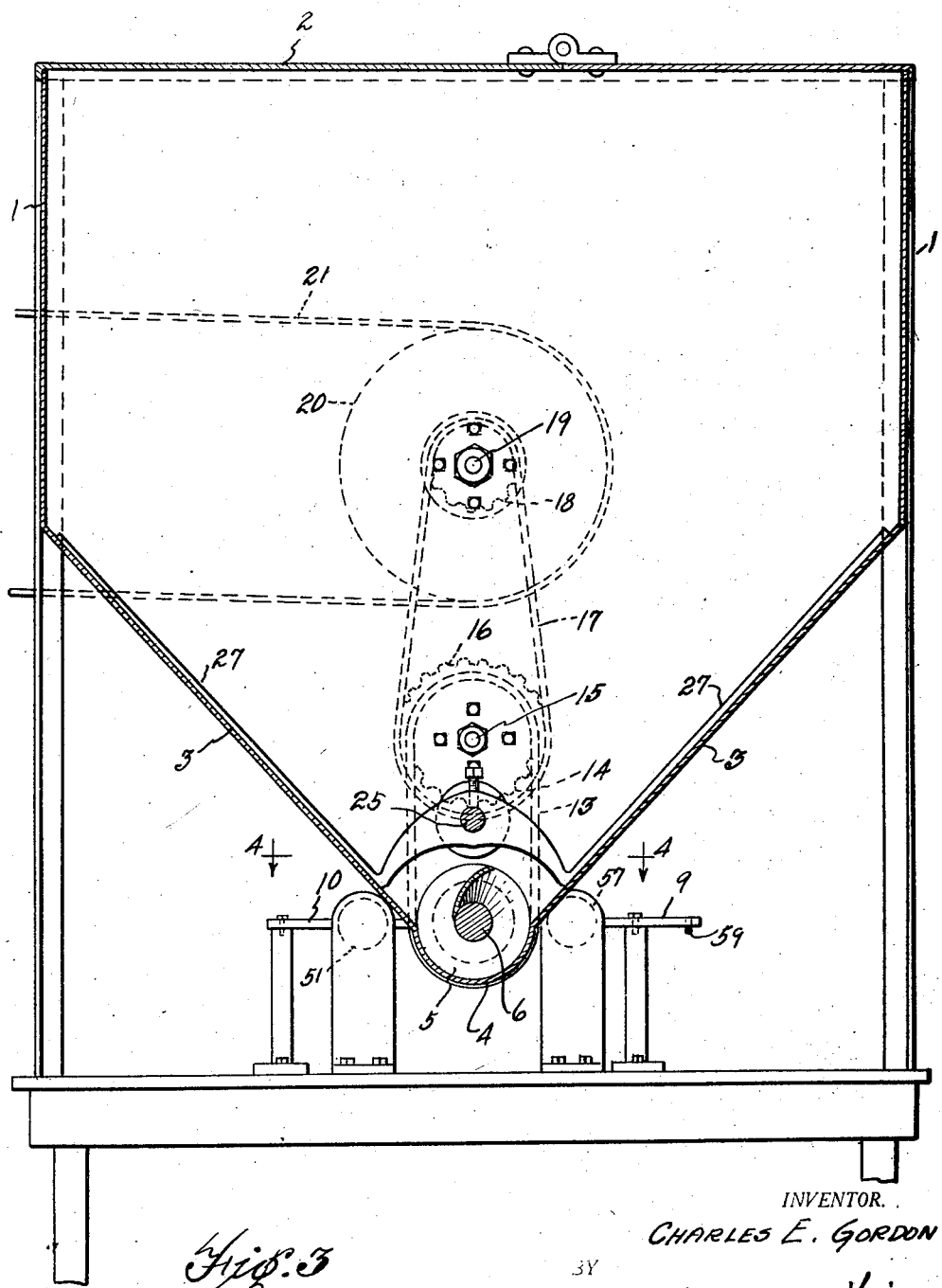

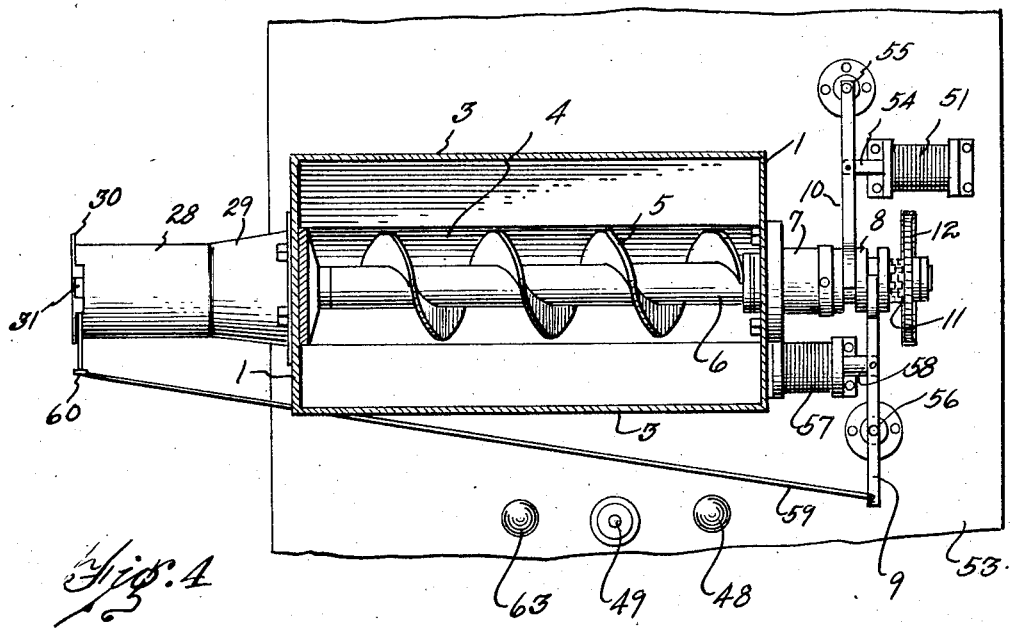

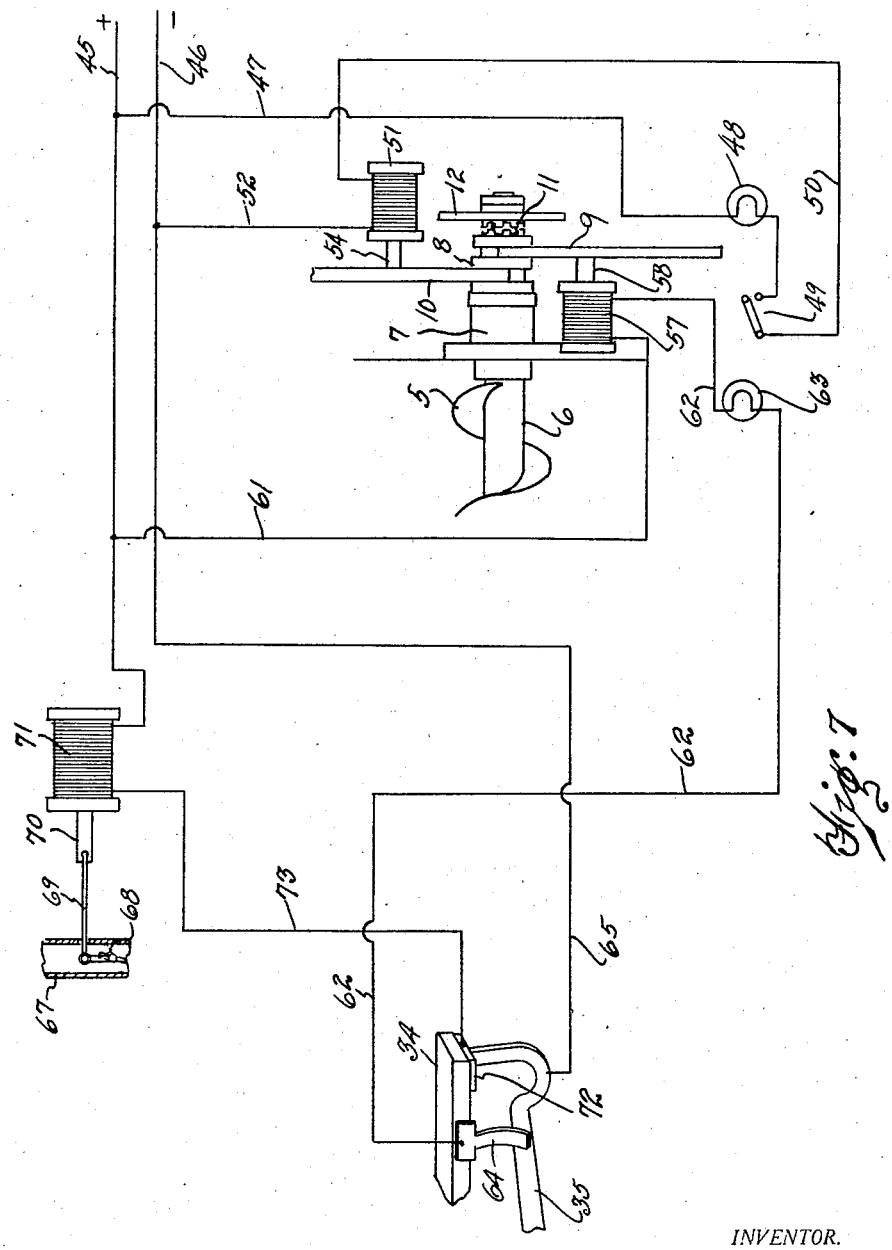

Patented Oct. 25, 1927.

1,646,817

UNITED STATES PATENT OFFICE.

CHARLES E. GORDON, OF DETROIT, MICHIGAN, ASSIGNOR OF ONE-HALF TO JOSEPH G. HEDRICK, OF HAILEY, IDAHO.

AUTOMATIC DISPENSING AND WEIGHING MACHINE.

Application filed September 24, 1925. Serial No. 58,251.

This invention relates to automatic dispensing and weighing machines and the object of the invention is to provide a machine which will automatically dispense material and exactly weigh the material dispensed.

Another object of the invention is to provide a machine which will automatically discharge a greater amount of material than required and will then remove some of the material until the exact desired weight is attained.

A further object of the invention is to provide a machine including a hopper for containing the material to be dispensed, the said hopper being provided with a means for agitating the material therein so that it will readily flow to the dispensing mechanism.

Another object of the invention is to provide a machine of the character described in which the dispensing mechanism may be automatically stopped by a scale on which the material dispensed is weighed.

Another object of the invention is to provide a means for automatically indicating when the machine has completed the dispensing and weighing operation and is ready for a succeeding operation.

These objects and the several novel features of the invention are hereinafter more fully described and claimed and the preferred form of construction by which these objects are attained is shown in the accompanying drawings in which—

Fig. 1 is an elevation of a dispensing and weighing machine embodying my invention.

Fig. 2 is a longitudinal section through the machine.

Fig. 3 is a section taken on line 3—3 of Fig. 2

Fig. 4 is a section taken on line 4—4 of Fig. 2

Fig. 5 is a section taken on line 5—5 of Fig. 1

Fig. 6 is a section taken on line 6—6 of Fig. 1

Fig. 7 is a diagrammatic view of the electric circuits employed in the machine.

As shown in Fig. 3 a hopper is provided having a hinged lid 2 through which the hopper may be filled and the hopper is provided with sloping sides 3 which at the bottom terminate in a arcuate portion 4 containing a screw 5 as shown in Figs. 2 and 3. The shaft 6 for the screw 5 extends through the end of the hopper and through the bearing 7 provided thereon and a clutch member 11 is provided which is driven by and secured to a sprocket 12. As shown in F Figs. 1, 2 and 3 the sprocket 12 is connected by means of a chain 13 with the sprocket 14 which is rotatably mounted on a stud shaft 15 and a sprocket 16 is secured to the sprocket 14 and is connected by a chain 17 with the sprocket 18 on the stud shaft 19. Rotatably mounted on the stud shaft 19 is a pulley 20 driven by the belt 21. The chain 17 rotates the sprockets 16 and 14 and the chain 13 rotates the sprocket 12 and clutch member 11. A cam 22 is rotatably mounted on the stud shaft 15 and is provided with a groove 23 in which a pin 24 is adapted to engage, the pin 24 being provided with a roller on the end thereof riding in the groove 23. This pin 24 is secured to a shaft 25 which extends through the bearings 26 provided therefor in the walls of the hopper and secured to the shaft 25 are three agitators 27 shown in Figs. 2 and 3 which extend upwardly along the angular sides 3 of the hopper. As the cam 22 is rotated the pin 24 is moved horizontally back and forth which moves the shaft 25 and agitators 27 thus loosening the material in the hopper and causing it to fall down onto the worm or screw 5.

The screw 5 is adapted to feed the material through the discharge tube 28 which is provided with a tapered portion 29 for compacting the material as it passes into the portion 28 and a lid 30 is hinged at 31 on the portion 28 and provides a closure for the discharge end of the portion 28. As shown in Fig. 1 a platform scale 32 is provided having an upright post 33 and a horizontally extending arm 34 and a movable arm 35 is provided having a sliding weight 36. As shown in Figs. 1 and 6 a container 37 is mounted on the platform scale having a removable receptacle 38 mounted on the upper end thereof and a series of shafts 39 extend across the bottom of the receptacle and are each provided with a flat member 40 adapted to close the bottom of the receptacle. An arm 41 is secured to each shaft 39 and a slide 42 is provided having a series of pins 43 extending through slots provided therefor in the respective arms 41. By moving the handle 44 from the position shown in full lines in Fig. 6 to that shown in dotted lines, the shafts 39 are turned to dump the material from the receptacle 38 into the container 37.

During operation the receptacle is closed and the receptacle and container 37 as will be understood from Fig. 1 are positioned on the platform 32 so that the material discharged from the machine falls into the receptacle 38.

This machine is preferably operated by electricity. For this reason I have provided two electrical conduits 45 and 46, the conduit 45 being marked positive while the conduit 46 is marked negative. A branch conduit 47 is connected to the conduit 45 and carries current through the lamp 48 and through the switch button 49 when the switch button is closed and the current then passes through the electrical conduit 50 and solenoid 51 and thence through the electrical conduit 52 to the negative conduit 46. As will be noted from Fig. 4 the solenoid 51 is mounted on the standard or base 53 for the machine and the core 54 of the solenoid 51 is pivotally connected to the lever 10 which engages the clutch member 8 and the opposite end of the lever 10 which is pivoted at 55 on the standard 53. Thus when the switch button 49 is closed current will pass through the solenoid 51 drawing the core 54 to the right of Fig. 4 to move the clutch member 8 into engagement with the clutch member 11 thus driving the worm shaft. The lever 9 shown in Fig. 4 is pivoted on the base 53 at 56 and also engages in the clutch member 8 and a solenoid 57 is provided having a core 58 pivotally connected to the lever 9. This solenoid 57 is so arranged that when it is energized it will draw the lever 9 to the left of Fig. 4 thus disengaging the clutch parts 8 and 11 so that the worm 5 is not driven. The outer end of the lever 9 is connected by means of a rod 59 to a lever 60 for turning the discharge door 30 on its pivot 31. When the parts are in position shown in Fig. 4 the door 30 is closed but when the clutch member 8 is moved into engagement with the clutch member 11, the lever 9 is turned on its pivot which movement is communicated through the rod 59 to open the discharge door 30. By this arrangement when the clutch parts are moved to drive the shaft 6, the door 30 is moved at the same time so that the material may readily pass from the machine and when the clutch parts are disengaged the worm stops rotating and the door is closed at the same time. The circuit for the solenoid 57 is shown in Fig. 7 and consists of the electrical conduit 61 which leads to the solenoid 57 and a conduit 62 leads from the solenoid 57 through the lamp 63 and to a contact member 64 shown more particularly in Fig. 5 which is adapted to be engaged by the movable arm of the scale which, as shown in Fig. 7 is connected by means of the electrical conduit 65 to the negative side 46 of the circuit. By this arrangement the solenoid 57 is energized by the automatic closing of its circuit through movement of the arm 35 of the scale.

To operate the device the container 37 and receptacle 38 are positioned on the platform scale directly beneath the discharge door 30 and the scale is adjusted to compensate for the weight of the receptacle and container and the weight 36 is adjusted on the arm 35 so that the arm 35 is moved upwardly when the desired amount of material is discharged into the receptacle. The clutch parts 8 and 11 at this time are in the disengaged position shown in Fig. 4 and to start the machine the switch button 49 as shown in Figs. 1, 4 and 7 is moved to close the circuit. The closing of this circuit lights the green lamp 48 shown in Figs. 1, 4 and 7 and energizes the solenoid 51 to move the lever 10 which engages the clutch part 8 in the clutch part 11. This movement of the clutch part 8 rotates the worm 5 to feed the material through the discharge conduit 28 and turns the lever 9 on its pivot to open the discharge door 30. The agitator shaft is reciprocated at this time by the cam 22 thus moving the agitators 27 and causing the material in the hopper to feed down into the worm 5 so that the worm is always provided with material to be discharged from the hopper. As the receptacle 38 as shown in Fig. 1 is filled with material to the desired weight the arm 35 moves upwardly into contact with the contact member 64 shown in Fig. 5 thus closing the circuit for the solenoid 57 shown in Fig. 7. As the solenoid 57 is energized it draws the lever 9 to the left of Fig. 4 on the pivot 56 thus disengaging the clutch and stopping rotation of the worm 5 and at the same time this movement of the lever 9 closes the door 30 to prevent further discharge of material into the receptacle 38. The closing of this circuit for the solenoid 57 lights the red lamp 63 shown in Figs. 1, 4 and 7. To remove the excess material from the receptacle 38 a suction fan 66 is provided which is mounted on the hopper 1 shown in Figs. 1 and 2 and may be driven by an electric motor or if desired may be positioned on the opposite side of the hopper and driven by a gearing from the pulley 20. A suction pipe 67 is connected to the suction fan and terminates directly over the material in the receptacle 38 beneath the discharge door 30. A valve 68 is provided in the pipe 67 as shown in Figs. 1, 2 and 7 which is connected by a rod 69 to the core 70 of the solenoid 71. This valve 68 is normally in the closed position but as the arm 35 moves upwardly it makes a contact with a member 72 on the scale arm 34 allowing current to flow through the electrical conduits 65 and 73 and through the solenoid 71 which is connected to the opposite side of the circuit. As the solenoid 71 is energized the valve 68 is opened at which time material is drawn from the receptacle 38 through the pipe 67 and through the fan 66 and is discharged through the pipe 74 back into the hopper. As the surplus material is removed from the receptacle 38 and the exact desired weight is attained the arm 35 moves downwardly slightly to break its contact with the member 72, thus breaking the circuit for the solenoid 71 and allowing the valve 68 to close to prevent further flow of material. The arm 35 however still maintains its contact with the contact 64 so that the red lamp 63 remains lighted until the receptacle and contents are removed from the scale. It will thus be seen that the machine discharges slightly more material than is required and the excess material is then removed automatically from the receptacle until the exact desired weight is attained and the red light 63 at this time indicates that the material has been weighed and that the machine is ready for a subsequent weighing operation.

This machine will operate with practically any pulverized material and it may be also utilized for weighing grain and granular material of all types that can be drawn upwardly through the suction pipe 67.

The receptacle 38 and container 37 is designed for use in the manufacture of rubber tires in which different pulverized material must be weighed exactly to form the rubber compound. For instance this machine may be set to weigh exactly ten pounds, six ounces of lamp black which is discharged from the hopper and into the receptacle 38. When the exact weight has been attained the handle 44 is moved to the left of Fig. 6 to dump the material from the receptacle 38 into the container 37, after which the handle 44 is moved back to close the bottom of the receptacle. The container 37 and receptacle 38 are then removed from the scale with the lamp black in the bottom of the container and receptacle are then positioned on the scale of a succeeding machine for dispensing manganese and the succeeding machine will discharge an exact weighed amount of manganese into the receptacle 38 which will then be dumped into the container and other ingredients may thus be added by succeeding machines.

By this arrangement when the container 37 is full it will contain the proper ingredients in exact weighed amounts for making a batch of rubber and will have a certain weight of each ingredient therein to conform with the formula being used. One of the particular advantages of this machine is that it prevents an accumulation of dust in the factory. For instance in handling lamp black which has been passed through a 200 mesh screen the material is so light that in hand weighing a dust continually arises from it.

In this machine the hopper is closed and though the material is agitated to properly feed it to the worm no dust escapes to the atmosphere. By providing a tapered discharge nozzle the material is compacted as it is discharged and has so little distance to fall into the receptacle 38 that it does not tend to fluff and the excess material which is drawn through the suction fan is discharged back into the hopper so that there is no opportunity for dust to arise and thus considerable saving in material is effected.

From the foregoing description it becomes evident that the device is simple, efficient, and automatic in operation, will not easily get out of order, will dispense an exact weight by first providing surplus material and then gradually removing the surplus material until the exact weight is attained and finally provides a device which accomplishes the objects described.

Having thus fully described my invention, its utility and mode of operation, what I claim and desire to secure by Letters Patent of the United States is—

1. A dispensing and weighing machine comprising a hopper for the material to be dispensed, a feed screw in the bottom of the hopper, means for driving the feed screw, a receptacle into which the material is adapted to be discharged, a scale on which the receptacle is positioned, a movable arm carried by the scale, a circuit adapted to be closed by the movable arm as a slight over-weight of material is discharged into the receptacle, a solenoid energized by the closing of the said circuit, the solenoid being adapted to disengage the feed screw from driving operation, a second circuit adapted to be closed by the said arm at the same time the first circuit is closed, a solenoid in the second circuit, a suction pipe terminating over the discharged material in the receptacle, a valve in the suction pipe adapted to be opened upon energization of the solenoid in the second circuit, the arrangement being such that as the material is withdrawn from the receptacle through the suction pipe the scale arm moves downwardly to break the circuit for the second solenoid and allow the valve to close.

2. A dispensing and weighing machine comprising a hopper a feed screw for discharging material from the hopper, means for driving the feed screw, means for agitating the material in the hopper, a weighing scale set to weigh a desired amount, a feed screw discharging material onto the weighing scale, a movable arm on the weighing scale adapted to move upwardly as an overweight of material is discharged onto the scale, a suction pipe for withdrawing material from the weighing scale, the suction pipe discharging into the hopper, a pair of solenoids adapted to be energized by movement of the arm upwardly, a valve normally closing the suction pipe, one of the solenoids being adapted upon energization to open the valve and the other solenoid being adapted upon energization to disengage the feed screw from driving operation, the arrangement being such that as the material is withdrawn through the suction pipe from the weighing scale the scale arm moves downwardly to break the circuit for the valve opening solenoid allowing the valve of the suction pipe to close.

3. A dispensing and weighing machine comprising a hopper, a feed screw for discharging material from the hopper, means for driving the feed screw, a weighing scale set to weigh a desired amount, the feed screw discharging material onto the weighing scale, a movable arm on the weighing scale by which the material is weighed, a suction pipe for withdrawing material from the weighing scale, a valve normally closing the suction pipe, a pair of circuits adapted to be closed by the movable arm as an overweight of material is discharged onto the scale, a solenoid in one circuit adapted upon energization to disengage the feed screw from driving operation, a solenoid in the other circuit adapted upon energization to open the valve in the suction pipe, the arrangement being such that as the material reaches the exact desired weight the scale arm is moved to break the circuit for the solenoid controlling the suction valve, and means for closing the suction valve as the said circuit is broken.

4. A dispensing and weighing machine comprising a hopper, a feed screw for discharging material from the hopper, means for driving the feed screw, a receptacle into which the material is adapted to be discharged, a scale on which the receptacle is positioned and having a movable arm, a pair of contacts adapted to be engaged by the movable arm as a slight over-weight of the material is discharged into the receptacle, one of the contacts closing a circuit, means in the said circuit adapted upon energization to disengage the feed screw from driving operation, the other of the said contacts being adapted to close a second circuit, means in said second circuit adapted upon energization to open a valve, a suction pipe in which the said valve is positioned, the suction pipe terminating in the discharged material, the arrangement being such that the circuit for operating the said valve is broken as the material reaches the exact desired weight.

5. A dispensing and weighing machine comprising a hopper, a feed screw for discharging material from the hopper, means for driving the feed screw, a weighing scale having a movable arm, the feed screw discharging material onto the weighing scale, a pair of circuits adapted to be closed by the movable arm as an overweight of material is placed on the scale, a solenoid in each circuit, one of the solenoids being adapted upon energization to disengage the feed screw from driving relation, a suction pipe terminating over the material on the scale, a valve in the suction pipe, the second solenoid being connected to the said valve and being adapted upon energization to open the valve, and means whereby the circuit for the last named solenoid is broken as the material on the scale is reduced to the exact desired weight.

In testimony whereof I sign this specification.

CHARLES E. GORDON.